(12) United States Patent
Salter et al.

(10) Patent No.: US 11,988,032 B2
(45) Date of Patent: May 21, 2024

(54) VEHICLE DOOR CONTROL SYSTEM

(71) Applicant: Ford Global Technologies, LLC, Dearborn, MI (US)

(72) Inventors: Stuart C. Salter, White Lake, MI (US); Aaron Halonen, Brighton, MI (US); Annette Lynn Huebner, Highland, MI (US); Kristin Ann Hellman, Walled Lake, MI (US); David Brian Glickman, Southfield, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 566 days.

(21) Appl. No.: 17/198,365

(22) Filed: Mar. 11, 2021

(65) Prior Publication Data

US 2022/0290484 A1 Sep. 15, 2022

(51) Int. Cl.
*E05F 15/73* (2015.01)
*B60J 5/04* (2006.01)
(Continued)

(52) U.S. Cl.
CPC ............... *E05F 15/73* (2015.01); *B60J 5/047* (2013.01); *B60J 5/105* (2013.01); *B60J 5/106* (2013.01);
(Continued)

(58) Field of Classification Search
CPC ..... E05F 15/73; E05F 15/71; E05F 2015/767; B60J 5/047; B60J 5/105; B60J 5/106;
(Continued)

(56) References Cited

U.S. PATENT DOCUMENTS 8,174,146 B2 5/2012 Cheal et al.
8,838,333 B2 9/2014 Cheal et al.
(Continued)

FOREIGN PATENT DOCUMENTS

JP 2018034793 A 3/2018
KR 2013-0058913 A * 6/2013

OTHER PUBLICATIONS

Machine Translation of Hoon's reference (KR20130058913A) (Year: 2013).*

*Primary Examiner* — Tarek Elarabi
(74) *Attorney, Agent, or Firm* — Vichit Chea; Price Heneveld LLP

(57) ABSTRACT

A vehicle door control system includes a door assembly, which includes a side door and a liftgate. The door assembly includes an actuation assembly that adjusts each of the side door and the liftgate between opened and closed positions. A sensor assembly defines a rear sensor field, a first side sensor field, and a second side sensor field. A controller determines whether a person in at least one of the rear sensor field, the first side sensor field, and the second side sensor field is a recognized passenger, determines a speed of the recognized passenger, determines whether the recognized passenger is carrying an object, and activates the actuation assembly to open at least one of the liftgate and the side door based on whether the recognized passenger is carrying an object, where timing of activation of the actuation assembly is based on the speed of the recognized passenger.

20 Claims, 8 Drawing Sheets

(51) Int. Cl.
  *B60J 5/10* (2006.01)
  *B60Q 3/20* (2017.01)
  *E05F 15/71* (2015.01)
  *E05F 15/72* (2015.01)
  *E05F 15/76* (2015.01)
  *G08B 3/10* (2006.01)

(52) U.S. Cl.
  CPC ............... *B60Q 3/20* (2017.02); *E05F 15/71* (2015.01); *E05F 15/72* (2015.01); *E05F 15/76* (2015.01); *G08B 3/10* (2013.01); *E05F 2015/767* (2015.01); *E05Y 2400/44* (2013.01); *E05Y 2400/45* (2013.01); *E05Y 2400/52* (2013.01); *E05Y 2400/66* (2013.01); *E05Y 2400/856* (2013.01); *E05Y 2900/531* (2013.01); *E05Y 2900/546* (2013.01)

(58) Field of Classification Search
  CPC ...... B60Q 3/20; B60Q 1/324; B60Q 2400/40; B60Q 1/323; G08B 3/10; G08B 25/016; G08B 13/19647; G08B 15/00; E05Y 2400/44; E05Y 2400/45; E05Y 2400/52; E05Y 2400/856; E05Y 2900/531; E05Y 2900/546; E05Y 2900/548; B60R 25/30; B60R 25/305
  See application file for complete search history.

(56) References Cited

U.S. PATENT DOCUMENTS

| | | | |
|---|---|---|---|
| 9,097,055 B2 | 8/2015 | Cheal et al. | |
| 9,308,802 B2 | 4/2016 | Warburton et al. | |
| 9,475,369 B2 | 10/2016 | Sugiura et al. | |
| 9,636,978 B2 | 5/2017 | Warburton et al. | |
| 9,676,258 B2 | 6/2017 | Warburton et al. | |
| 9,909,347 B2 | 3/2018 | Warburton et al. | |
| 10,525,850 B1 | 1/2020 | Tang et al. | |
| 2008/0296926 A1 | 12/2008 | Hanzel et al. | |
| 2015/0025751 A1* | 1/2015 | Sugiura | B60J 5/101 |
| | | | 701/49 |
| 2015/0291126 A1* | 10/2015 | Nicholls | B60R 25/2054 |
| | | | 701/49 |
| 2015/0336521 A1 | 11/2015 | Tofilescu et al. | |
| 2016/0300410 A1 | 10/2016 | Jones et al. | |

* cited by examiner

VEHICLE DOOR CONTROL SYSTEM

FIELD OF THE DISCLOSURE

The present disclosure generally relates to a door control system. More specifically, the present disclosure relates to a door control system or a vehicle.

BACKGROUND OF THE DISCLOSURE

Vehicles typically have multiple doors that are independently operable between opened and closed positions. The doors may include side doors and a rear door. The side doors may provide selective access to a passenger cabin, while the rear door may provide selective access to a cargo area.

SUMMARY OF THE DISCLOSURE

According to at least one aspect of the present disclosure, a door control system for a vehicle includes a liftgate assembly including a liftgate actuation assembly operably coupled to at least one liftgate panel. The liftgate actuation assembly adjusts the at least one liftgate panel between an opened position and a closed position. A side door assembly includes a door actuation assembly operably coupled to at least one side door. The door actuation assembly adjusts the at least one side door between an opened position and a closed position. A sensor assembly includes a first sensor defining a rear sensor field extending outwardly from the liftgate assembly and a second sensor defining a side sensor field extending outwardly from the side door assembly. A controller is communicatively coupled with the liftgate assembly, the side door assembly, and the sensor assembly. The controller determines whether a person detected in at least one of the rear sensor field and the side sensor field is a recognized passenger, determines a speed of the recognized passenger, and activates at least one of the liftgate actuation assembly and the door actuation assembly to adjust the at least one liftgate panel and the at least one side door, respectively, to the opened position based on a position of the recognized passenger relative to said vehicle and the speed of recognized passenger.

According to another aspect of the present disclosure, a vehicle door control system includes a vehicle body. A door assembly is coupled to the vehicle body and includes at least one side door and a liftgate. The door assembly includes an actuation assembly that adjusts each of the at least one side door and the liftgate between an opened position and a closed position. A sensor assembly is coupled to the vehicle body and defines a rear sensor field, a first side sensor field, and a second side sensor field. A controller is communicatively coupled with the door assembly and the sensor assembly. The controller determines whether a person in at least one of the rear sensor field, the first side sensor field, and the second side sensor field is a recognized passenger, determines a speed of the recognized passenger, determines whether the recognized passenger is carrying an object, and activates the actuation assembly to open at least one of the liftgate and the at least one side door based on whether the recognized passenger is carrying an object, where timing of activation of the actuation assembly is based on the speed of the recognized passenger.

According to another aspect of the present disclosure, a door control system for a vehicle includes a door assembly including an actuation assembly. The door assembly includes a front driver door, a rear driver door, a front passenger door, a rear passenger door, and a liftgate. A sensor assembly includes a rear sensor defining a rear sensor field extending from the liftgate, a passenger side sensor defining a passenger side sensor field extending from a passenger side of said vehicle, and a driver side sensor defining a driver side sensor field extending from a driver side of said vehicle. A controller is in communication with the actuation assembly and the sensor assembly. The controller determines whether people within at least one of the rear sensor field, the passenger side sensor field, and the driver side sensor field are recognized passengers, determines whether at least one of the recognized passengers is carrying an object; activates the actuation assembly to open the liftgate when the object is detected, determines whether at least one of the recognized passengers is a child; and activates the actuation assembly to open at least one of the rear passenger door and the rear driver door when one of the recognized passengers is the child.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
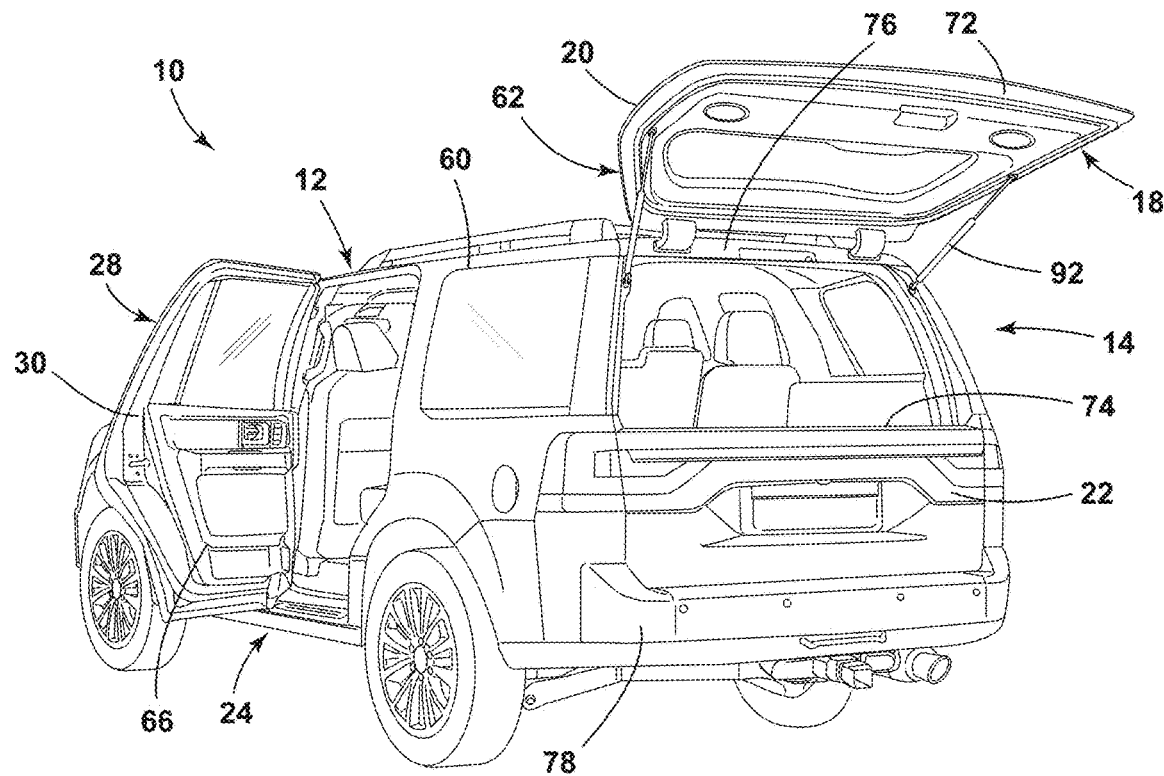
FIG. 1 is a rear perspective view of a vehicle having a door control system, where an upper liftgate panel is opened and a lower liftgate panel is closed, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 10 generally designates a door control system for vehicle 12. A liftgate assembly 14 includes a liftgate actuation assembly 16 operably coupled to at least one liftgate panel 18. The liftgate actuation assembly 16 adjusts the liftgate panel 18 between an opened position 20 and a closed position 22. A side door assembly 24 includes a door actuation assembly 26 operably coupled to at least one side door 28. The door actuation assembly 26 adjusts the side door 28 between an opened position 30 and a closed position 32. A sensor assembly 34 includes a first sensor 36 that defines a rear sensor field 38 that extends outwardly from the liftgate assembly 14 and a second sensor 40 that defines a side sensor field 42 that extends outwardly from the side door assembly 24. A controller 44 is communicatively coupled to the liftgate assembly 14, the side door assembly 24, and the sensor assembly 34. The controller 44 determines whether a person detected in at least one of the rear sensor field 38 and the side sensor field 42 is a recognized passenger 46. The controller 44 also determines a speed of the recognized passenger 46. Additionally, the controller 44 activates at least one of the liftgate actuation assembly 16 and the door actuation assembly 26 to adjust at least one of the liftgate panel 18 and the side door 28 to the opened position 20, 30, respectively, based on a position of the recognized passenger 46 relative to the vehicle 12 and the speed of the recognized passenger 46.

Figure 2:
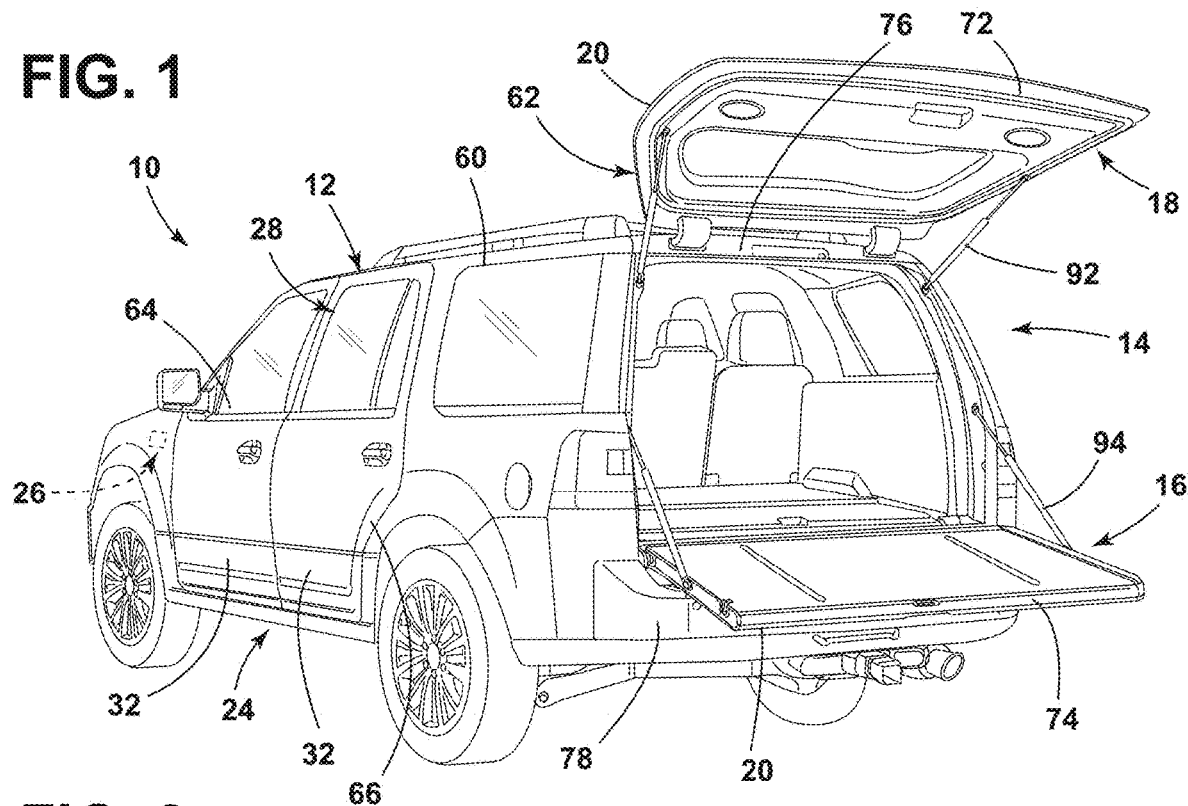
FIG. 2 is a rear perspective view of a vehicle having a door control system, where an upper liftgate panel and a lower liftgate panel are opened, according to the present disclosure.

Referring to FIGS. 1 and 2, the vehicle 12 includes a vehicle body 60 with a plurality of doors 62 rotatably coupled thereto. The doors 62 include the side doors 28 and a rear door, illustrated as the liftgate assembly 14. The vehicle 12 generally includes a front driver door 64, a rear driver door 66, a front passenger door 68, and a rear passenger door 70 (FIG. 4), which are collectively referred to herein as the side doors 28.

In the illustrated example, the liftgate assembly 14 (e.g., the rear door) is a split liftgate, which includes an upper liftgate panel 72 and a lower liftgate panel 74, collectively referred to as the liftgate panels 18. The upper liftgate panel 72 is rotatably coupled to the vehicle body 60 proximate to a roof 76. The upper liftgate panel 72 is operable between the opened position 20, which is a raised position, and the closed position 22, which is a lowered position. The lower liftgate panel 74 is rotatably coupled to the vehicle body 60 proximate to the bumper 78. The lower liftgate panel 74 is also operable between the opened position 20, which is a lowered position, and the closed position 22, which is a raised position. The upper liftgate panel 72 and the lower liftgate panel 74 are independently operable between the opened and closed positions 20, 22. It is contemplated that the rear door may be configured as a liftgate, a split liftgate, tailgate, or other rear doors without departing from the teachings herein.

Figure 3:
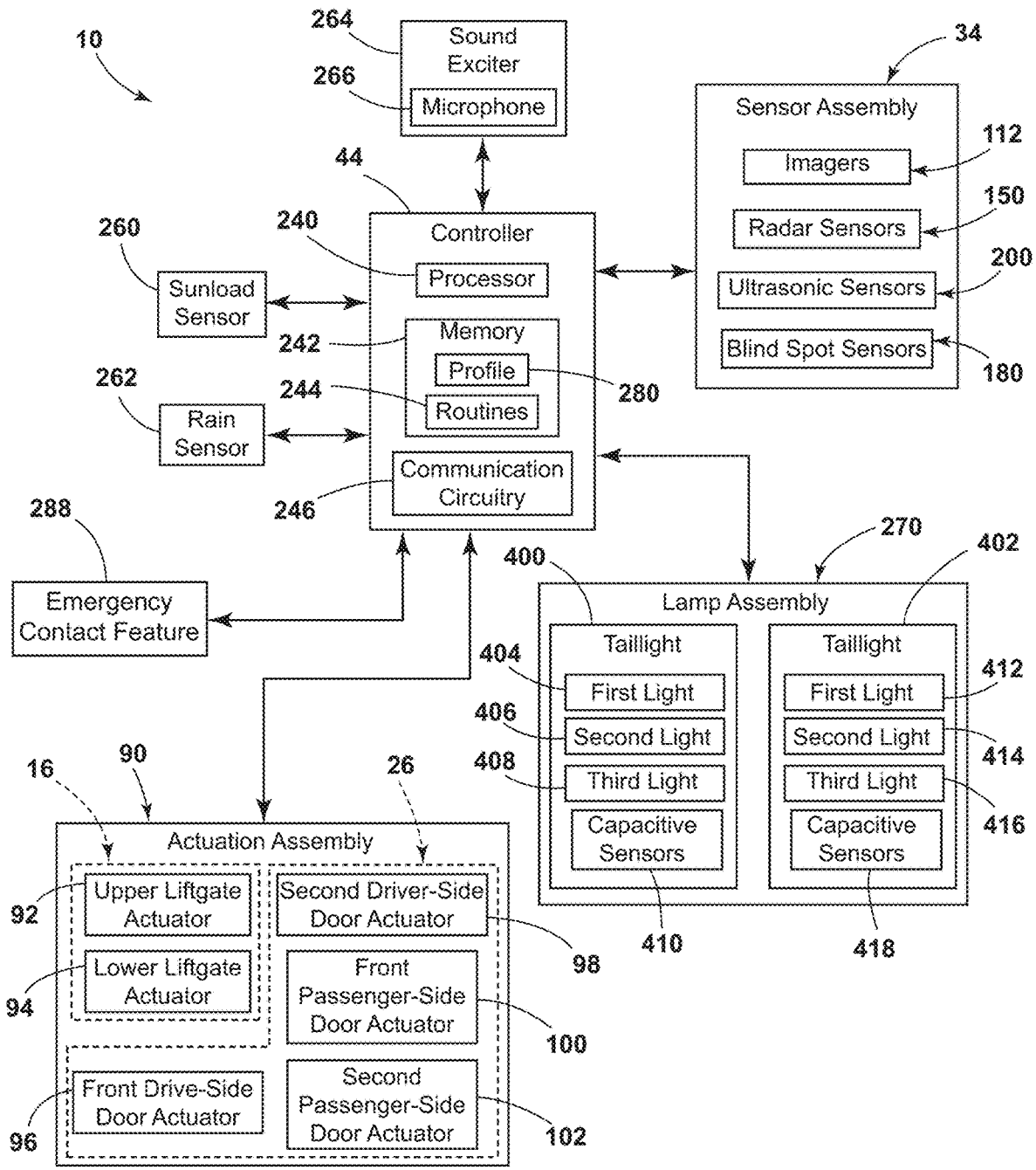
FIG. 3 is a block diagram of a vehicle door control system, according to the present disclosure.

Referring still to FIGS. 1 and 2, as well as FIG. 3, each of the doors 62 is configured as a powered door. The vehicle 12 includes an actuation assembly 90, which includes the liftgate actuation assembly 16 and the door actuation assembly 26. The actuation assembly 90 operates to adjust the doors 62 between the opened positions 20, 30 and the closed positions 22, 32, respectively. Each of the doors 62 is operably coupled with an individual actuator that allows each door 62 to be independently adjusted. For example, the liftgate actuation assembly 16 includes an upper liftgate actuator 92 operably coupled to the upper liftgate panel 72 and a lower liftgate actuator 94 operably coupled to the lower liftgate panel 74. In the illustrated example, the door actuation assembly 26 includes a first driver-side door actuator 96 operably coupled to the front driver door 64, a second driver-side door actuator 98 operably coupled to the rear driver door 66, a first passenger-side door actuator 100 operably coupled to the front passenger door 68 and a second passenger-side actuator 102 operably coupled to the rear passenger door 70.

The vehicle 12 is illustrated as a sport utility vehicle, however, the vehicle 12 may be a sedan, a truck, a van, a crossover, other wheeled motor vehicles, or other styles or types of vehicles 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 may be utilized for personal or commercial purposes, such as, transporting, ride-providing services (e.g., chauffeuring), or ride-sharing services.

Figure 4:
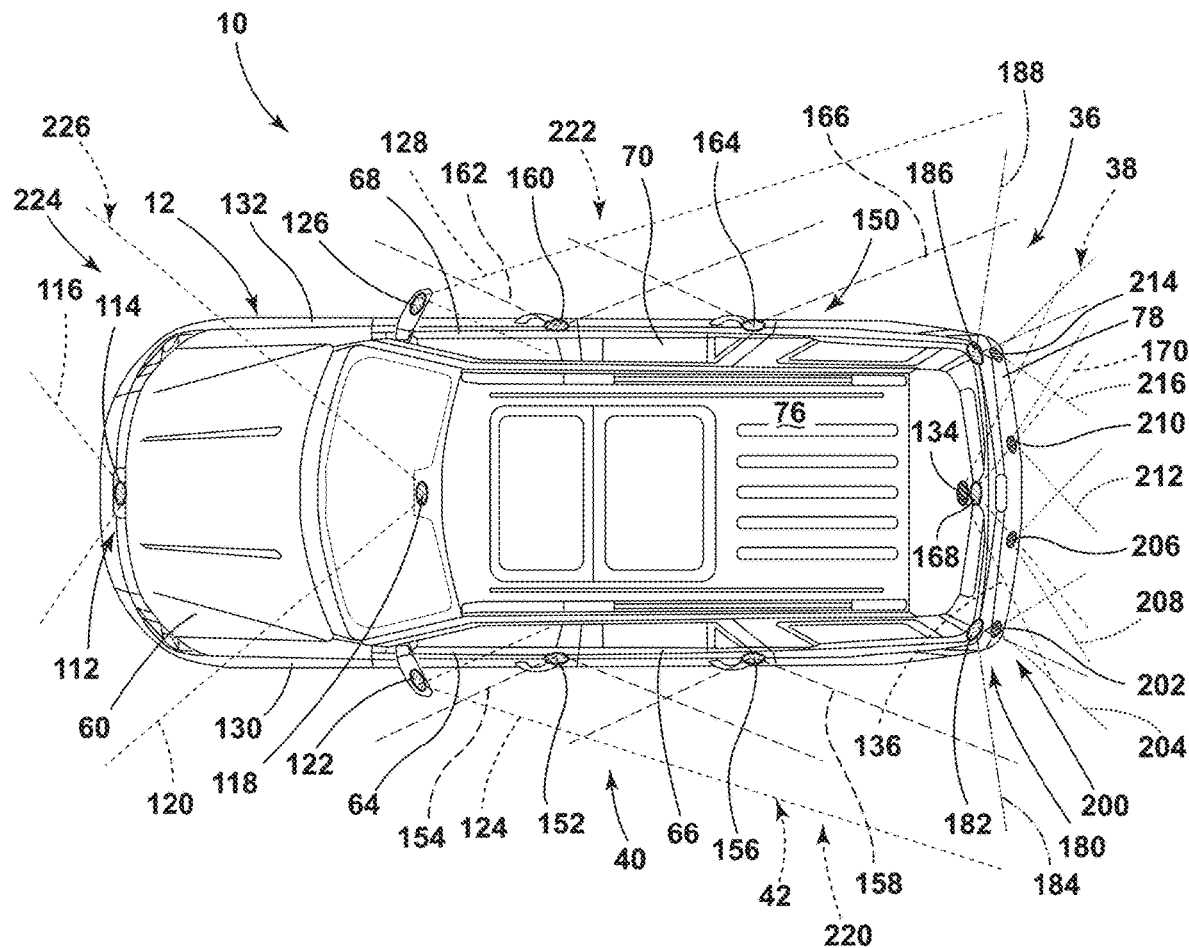
FIG. 4 is a top plan view of a vehicle having a door control system, according to the present disclosure.

Referring still to FIG. 3, as well as FIG. 4, the vehicle 12 includes the sensor assembly 34 configured to detect or sense people proximate to the vehicle 12. The sensor assembly 34 includes a plurality of sensors arranged in multiple locations along the vehicle body 60. In the illustrated example, the sensor assembly 34 includes imagers 112. The imagers 112 may be charge-coupled devices, complementary metal-oxide semiconductor imagers, or any type of black-and-white or color cameras. In the illustrated example, the vehicle 12 includes a front bumper imager 114 defining a sensor field 116 extending in a vehicle-forward direction and a front mirror imager 118 defining a sensor field 120 extending in the vehicle-forward direction.

The sensor assembly 34 also includes a first side mirror imager 122 defining a sensor field 124 and a second side mirror imager 126 defining a sensor field 128. Generally, the first side mirror imager 122 is disposed on a driver side 130 of the vehicle 12, and the side mirror imager 126 is disposed on a passenger side 132 of the vehicle 12. Each of the sensor fields 124, 128 of the first and second side mirror imagers 122, 126 extend in a vehicle-rearward direction along sides of the vehicle 12, respectively.

Additionally, the sensor assembly 34 includes a rear imager 134 defining a sensor field 136 that extends in the vehicle-rearward direction. It is contemplated that the rear imager 134 may be disposed proximate to the roof 76 or proximate to the bumper 78. Additionally, the vehicle 12 may include multiple rear imagers 134 that may be selectively and independently activated. Multiple rear imagers 134 may be advantageous for when an object is attached to a hitch of the vehicle 12, which may block one of the rear imagers 134.

Referring still to FIGS. 3 and 4, in the illustrated example, the sensor assembly 34 also includes radar sensors 150. In certain aspects, each radar sensor 150 may include a radar chip. In such aspects, multiple radar chips may be coupled together to form imaging radars. The sensor assembly 34 includes a first driver radar sensor 152 defining a sensor field 154 and a second driver radar sensor 156 defining a sensor field 158. The first driver radar sensor 152 is generally coupled to the vehicle 12 proximate to the front driver door 64 and the second driver radar sensor 156 is generally coupled proximate to the rear driver door 66. The sensor fields 154, 158 extend outwardly from the driver side 130 of the vehicle 12.

The sensor assembly 34 also includes a first passenger radar sensor 160 defining a sensor field 162 and a second passenger radar sensor 164 defining a sensor field 166. The first passenger radar sensor 160 is coupled to the vehicle 12 proximate to the front passenger door 68 and the second passenger radar sensor 164 is generally coupled proximate to the rear passenger door 70. The sensor fields 162, 166 extend outward from the passenger side 132 of the vehicle 12. The sensor assembly 34 also includes a rear radar sensor 168 disposed proximate to the rear imager 134. The rear radar sensor 168 defines a sensor field 170 extending in the vehicle-rearward direction from proximate the liftgate assembly 14 (FIG. 1). Each of the sensor fields 154, 158, 162 166, 170 of the radar sensors 150 generally extends in a range of about 3 m to about 5 m from the vehicle 12 and may extend over a 180° area.

Further, in the illustrated example, the sensor assembly 34 includes blind spot sensors 180 coupled to the vehicle-rearward portion of the vehicle body 60. The blind spot sensors 180 generally include a first blind spot sensor 182 defining a sensor field 184 and a second blind spot sensor 186 on the opposing side of the vehicle 12 defining a sensor field 188. The sensor fields 184, 188 extend outwardly to encompass a blind spot area of the vehicle 12. Generally, the blind spot sensors 180 are included as part of a blind spot monitoring system, which provides an alert or indicator to a driver of the vehicle 12 when an object is within one of the sensor field 184, 188.

Referring still to FIGS. 3 and 4, in the illustrated example, the sensor assembly 34 also includes ultrasonic sensors 200 coupled to the vehicle-rearward portion of the vehicle 12. The sensor assembly 34 includes a first ultrasonic sensor 202 defining a sensor field 204, a second ultrasonic sensor 206 defining a sensor field 208, a third ultrasonic sensor 210 defining a sensor field 212, and a fourth ultrasonic sensor 214 defining a sensor field 216. The ultrasonic sensors 200 are arranged along a width of the vehicle 12 with each of the sensor fields 204, 208, 212, 216 extending in the vehicle-rearward direction. Generally, the ultrasonic sensors 200 are utilized to determine a distance between the vehicle 12 and a sensed object utilizing ultrasonic waves.

The sensor assembly 34 includes multiple sensors and imagers arranged around the vehicle body 60 for detecting an object or person proximate to the vehicle 12. The sensors and imagers of the sensor assembly 34 on the vehicle-rearward portion of the vehicle 12, including the rear imager 134, the rear radar sensor 168, the blind spot sensors 180, and ultrasonic sensors 200 may collectively be referred to as the first sensor 36 and which collectively define the rear sensor field 38. The sensors on the driver side 130 and the passenger side 132 of the vehicle 12, including the side mirror imagers 122, 126 and the radar sensors 152, 156, 160, 164 may generally be referred to as the second sensor 40 and which collectively define the side sensor fields 42. The side sensor fields 42 includes a driver side sensor field 220 and a passenger side sensor field 222.

The sensors arranged in the vehicle-forward portion of the vehicle 12, including the front bumper imager 114 and the front mirror imager 118 may collectively be referred to as a third sensor 224 and which collectively define a forward sensor field 226. In this way, the first, second, and third sensors 36, 40, and 224 of the vehicle 12 collectively sense an area approximately 360° around the vehicle 12. The door control system 10 may utilize information sensed or detected by the sensor assembly 34, as described further herein. It is contemplated that the sensors and arrangement of sensors are merely exemplary and that the vehicle 12 may include additional, fewer, or alternative sensors and the sensor fields may be oriented differently without departing from the teachings herein.

Figure 5:
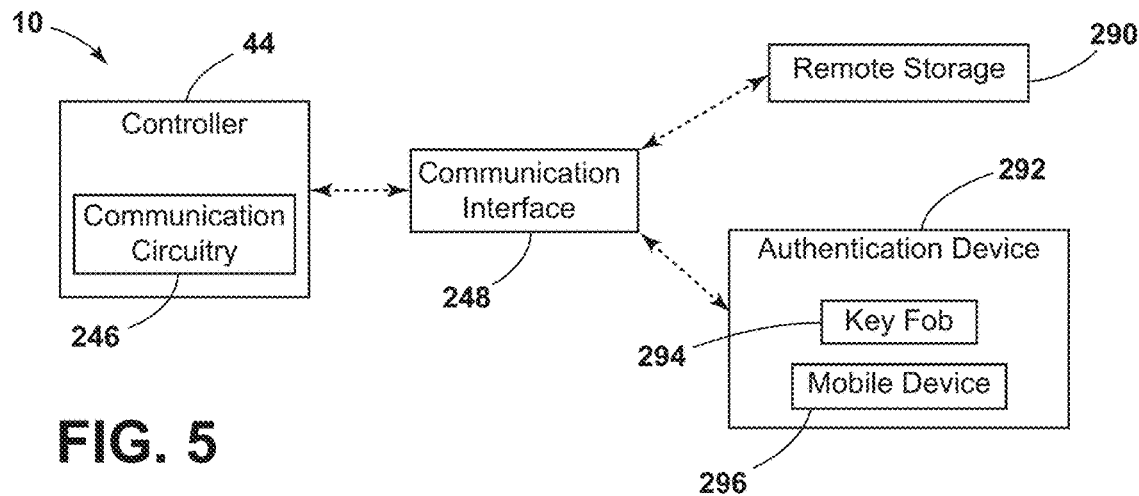
FIG. 5 is a block diagram of a controller of a vehicle door control system in communication with external devices, according to the present disclosure.

Referring still to FIG. 3, the door control system 10 includes the controller 44, which has a processor 240, a memory 242, and other control circuitry. Instructions or routines 244 are stored in the memory 242 and executable by the processor 240. The control circuitry may include communication circuitry 246 for communicating via a communication interface 248 (FIG. 5). The controller 44 may include various types of control circuitry, digital or analog, and may include the processor 240, a microcontroller, an application specific integrated circuit (ASIC), or other circuitry configured to perform the various inputs or outputs, control, analysis, or other functions described herein. The memory 242 disclosed herein may be implemented in a variety of volatile and nonvolatile memory formats, and the routines 244 may include operating instructions to enable the various methods described herein.

The door control system 10 includes a sunload sensor 260 coupled to the vehicle body 60 (FIG. 1). The sunload sensor 260 senses a level of sunlight proximate to the vehicle 12. The controller 44 generally stores a predefined sunlight level within the memory 242. The controller 44 receives the sensed sunlight level from the sunload sensor 260 and compares the sensed information to the predefined sunlight level. If the sensed information is above the predefined sunlight level, the controller 44 may determine that it is daytime and, therefore, light proximate to the vehicle 12. If the sensed information is below the predefined sunlight level, the controller 44 may determine that it is nighttime and that darkness has fallen.

The door control system 10 also includes a rain sensor 262 coupled to the vehicle body 60. The rain sensor 262 senses or detects precipitation, such as rain or snow, on the vehicle 12. It is contemplated that the rain sensor 262 may be coupled to a windshield of the vehicle 12 and may be associated with an automatic windshield wiper control feature.

Referring still to FIG. 3, the controller 44 is also in communication with a sound exciter 264 coupled to the vehicle 12. The sound exciter 264, is configured to emit sounds or alerts in response to a signal from the controller 44. The sound exciter 264 may also include a microphone 266 for receiving a voice command. The sound exciter 264 and the microphone 266 may also be used to calibrate the door control system 10, as described further herein.

The controller 44 utilizes information from the sensor assembly 34 to adjust the actuation assembly 90, a lamp assembly 270, or a combination thereof. Information sensed by the sensor assembly 34 is communicated to the controller 44 and analyzed. Based on which sensor field 38, 42, 226 the person is sensed in, the controller 44 may activate the actuation assembly 90 to open at least one of the doors 62 of the vehicle 12, as described further herein.

The controller 44 includes at least one routine 244 related to image processing and facial recognition of data received from the sensor assembly 34, for example, image data from the imagers 112. Generally, the imagers 112 capture image data within the respective sensor field and communicate the image data to the controller 44. The controller 44 processes the image data to determine whether the person detected by the sensor assembly 34 is the recognized passenger 46 or recognized passengers 46.

The controller 44 includes profiles 280 associated with each recognized passenger 46 of the vehicle 12 stored within the memory 242. Each recognized passenger 46 may stand within one of the sensor fields 38, 42, 226, allowing the door control system 10 to capture data of each recognized passenger 46. The recognized passenger 46 may state his or her name and/or status (e.g., owner, adult, child, etc.), which may be detected by the microphone 266 and communicated to the controller 44. The controller 44 may then correlate the status given via voice command with the data to store the information in the respective profile 280.

The door control system 10 may also include an emergency contact feature 288 in communication with the controller 44. The emergency contact feature 288 may communicate with emergency services in response to a signal by the controller 44. The controller 44 may signal the emergency contact feature 288 to contact emergency services in response to people proximate to the vehicle 12 that are not recognized passengers 46, as described herein. The emergency contact feature 288 may also communicate data, such as data sensed by the sensor assembly 34, to emergency services.

Referring still to FIG. 3, as well as FIG. 5, the controller 44 communicates with external devices via the communication interface 248. The external devices may include, for example, a remote storage 290 and an authentication device 292. Image data captured by one of the imagers 112 and other data captured by the sensor assembly 34 may be communicated to the remote storage 290. Storing the data in the remote storage 290 may be advantageous for security purposes, as described herein. The authentication device 292 may include at least one of a key fob 294 and a mobile device 296, such as a phone, a tablet, or a wearable device. The mobile device 296 may be configured as a Phone as a Key, having software that allows the mobile device 296 to communicate with the vehicle 12. A user may control various features of the vehicle 12 through the mobile device 296.

The controller 44 detects the authentication device 292 and activates the sensor assembly 34 in response. The communication interface 248 is generally a wireless communication interface. The communication interface 248 may be implemented via one or more direct or indirect nonhierarchical communication protocols, including Bluetooth®, Bluetooth® Low Energy (BLE), radio frequency identification (RFID), Wi-Fi, etc. depending on the configuration of the authentication device 292.

Figure 6:
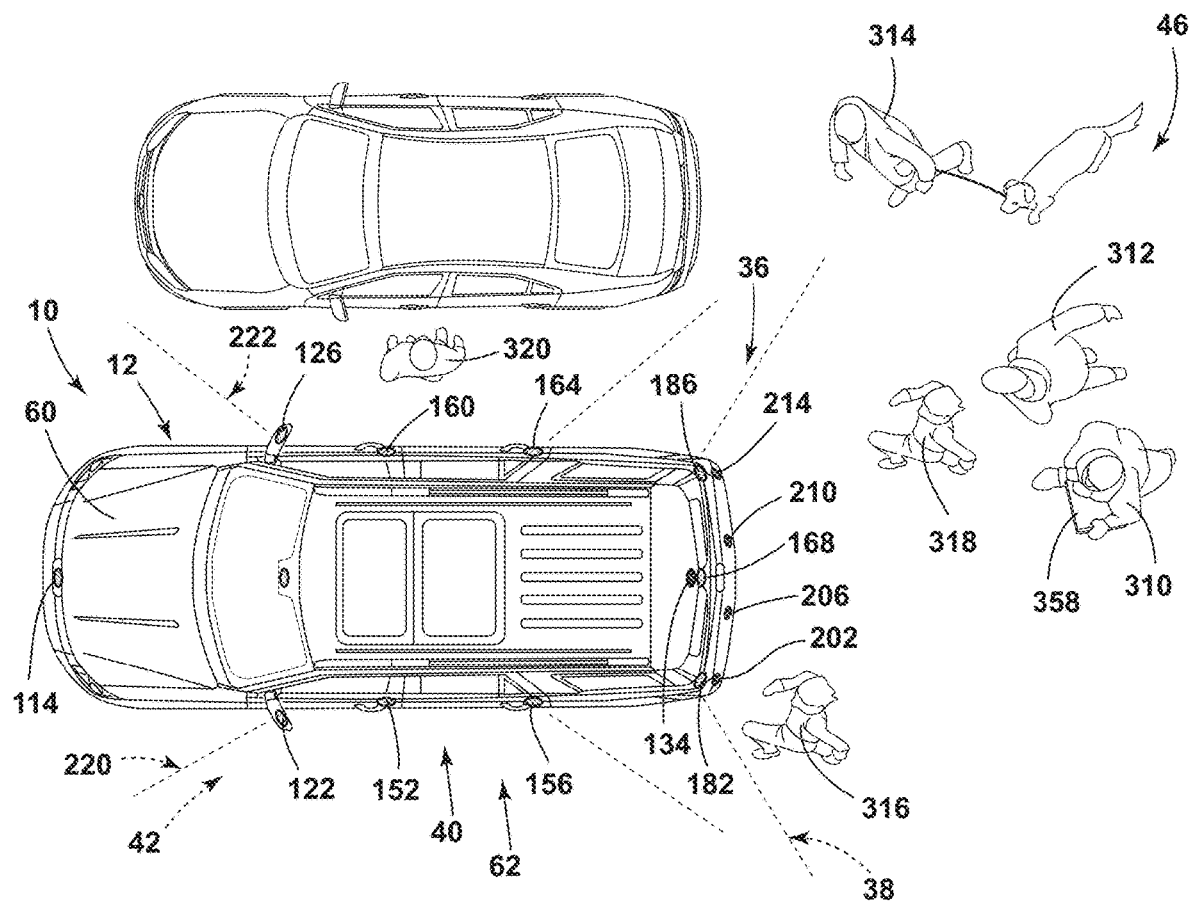
FIG. 6 is a schematic diagram of people positioned proximate to a vehicle having a door control system, according to the present disclosure.

Referring still to FIG. 3, as well as FIG. 6, the door control system 10 is configured to operate the various doors 62 of the vehicle 12 in response to information detected by the sensor assembly 34. In the example scenario illustrated in FIG. 6, multiple recognized passengers 46 are detected within the rear sensor field 38. The recognized passengers 46 include a driver or owner 310, non-owner adult passengers 312, 314, and children 316, 318. Imaging of the recognized passenger 46 is obtained by the first sensor 36, which then communicates the information to the controller 44. The controller 44 processes the image data and compares image data with the stored profiles 280 to determine that each person within the rear sensor field 38 is one of the recognized passengers 46.

The sensor assembly 34 also detects a position of each recognized passenger 46 relative to the vehicle 12 (e.g. proximate the driver side 130, the passenger side 132, etc.). Further, based on the information received from the sensor assembly 34, the controller 44 determines a speed and direction each recognized passenger 46 is traveling. For example, the child 316 is traveling toward the driver side 130 and is traveling at a speed faster than the child 318. The controller 44 utilizes the information related to direction and speed to time activation of the actuation assembly 90 to open the respective doors 62 as the approaching recognized passengers 46 reach the doors 62.

As illustrated in FIG. 6, a stranger 320 is sensed within the passenger side sensor field 222. The stranger 320 is a person who is not recognized by the door control system 10 and has no associated profile 280. The detection of the stranger 320 may affect the operation of the doors 62, as described herein.

Figure 7:
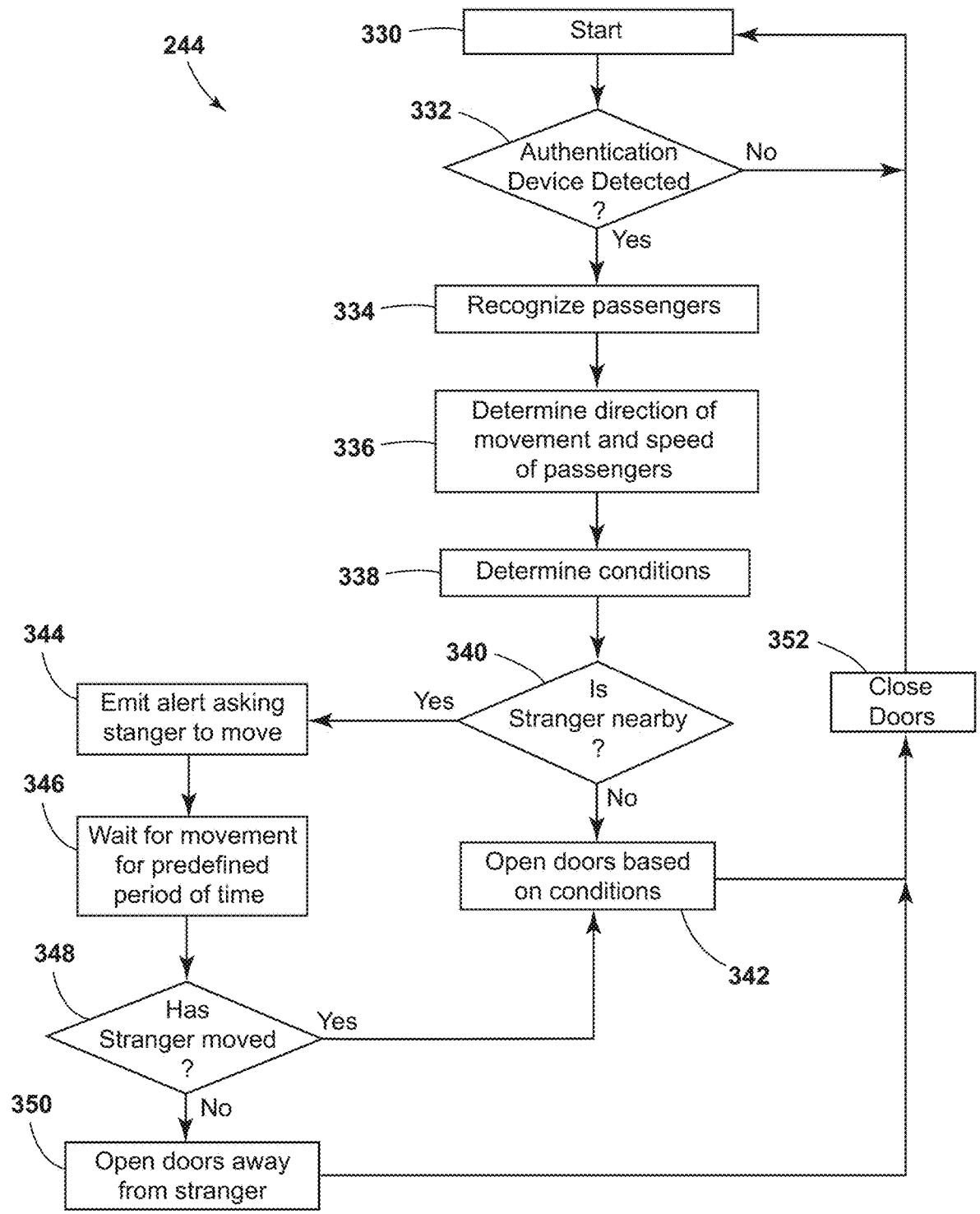
FIG. 7 is a flow diagram of a method of controlling doors of a vehicle with a door control system, according to the present disclosure.

Referring to FIG. 7, as well as FIGS. 1-6, the controller 44 includes at least one routine 244 for controlling the doors 62 of the vehicle 12. The routine 244 starts at 330 and the controller 44 moves to decision step 332 where the controller 44 determines whether the authentication device 292 is detected. If the authentication device 292 is not detected, the controller returns to step 330. Returning to decision step 332, if the authentication device 292 is detected, the controller 44 proceeds to step 334 where the controller 44 receives and processes data received from the sensor assembly 34. The controller 44 analyzes the data and determines whether a person or people are detected by the sensor assembly 34. If a person or people are detected, the controller 44 compares the received data with the stored profiles 280 to determine whether any of the people within the data are recognized passengers 46.

In step 336, the controller 44 utilizes the data from the sensor assembly 34 to determine a direction of movement of each recognized passenger 46. Additionally, in step 336, the controller 44 determines the speed each of the recognized passengers 46 is moving. In certain aspects, the controller 44 determines the speed of each recognized passenger 46 is traveling in approaching vehicle 12. In step 338, the controller 44 determines a variety of conditions that relate to which doors 62 are to be opened, as described further herein.

In decision step 340, the controller 44 determines whether the stranger 320 is positioned proximate to the vehicle 12. If the stranger 320 is not positioned proximate to the vehicle 12, the controller 44 proceeds to step 342 of the opening of the doors 62 based on the conditions determined in step 338. Returning to decision step 340, if the controller 44 determines that the stranger 320 is positioned proximate to the vehicle 12, the controller 44 proceeds to step 344 of emitting an alert via the sound exciter 264. The alert may be a sound or may be words, such as a phrase asking the stranger 320 to move away from the vehicle 12.

After emitting the alert, the controller proceeds to step 346 where the controller 44 waits a predefined period of time to determine whether the stranger 320 has moved away from the vehicle 12. The predefined period of time may be, for example, about 10 seconds, about 30 seconds, etc. from when the alert was emitted. After the predefined period of time has elapsed, the controller 44 proceeds to decision step 348 of determining whether the stranger 320 has moved away from the vehicle 12. If the stranger 320 has moved away from vehicle 12 as detected by the sensor assembly 34, the controller proceeds to step 342 and the doors 62 are opened based on the conditions determined in step 338.

Returning to decision step 348, if the stranger 320 has not moved away from the vehicle 12 (e.g., is still positioned proximate to the vehicle 12), the controller proceeds to step 350 where the doors 62 away from the stranger 320 are opened. In step 350, the controller 44 uses the conditions determined in step 338 and modifies which doors 62 are opened based on the detected stranger 320. For example, in the illustrated configuration of FIG. 6, when the stranger 320 is detected proximate to the passenger side 132 of the vehicle 12, the doors 62 on the driver side 130 are to be opened.

Further, in decision step 348, if the stranger 320 has moved closer to the vehicle 12 after the alert was emitted, a second alert may be emitted from the sound exciter 264. The sound exciter 264 may alert the stranger 320 that the area surrounding the vehicle 12 is being recorded. The sensor assembly 34 may capture the data from the sensor fields 38, 42, 226 and the controller 44 may transmit the data to the remote storage 290. Additionally, if a predefined voice command, such as "help," is received by the microphone 266, the controller 44 signals the emergency contact feature 288 to contact emergency services and/or communicate the data from the sensor assembly 34.

Once the respective doors 62 are open in step 342 or step 350, the recognized passenger 46 may enter the vehicle 12. It is contemplated that the doors 62 may not open if the recognized passenger 46 is within a movement path of the respective door 62. Further, the sound exciter 264 may emit an alert indicating that the recognized passenger 46 is in the movement path. Once the movement path is clear, the respective door 62 may open according to step 342 or step 350. The controller 44 proceeds to step 352 of closing the doors 62 once the passengers are within the vehicle 12. It is also contemplated, that the doors 62 are closed when the detected recognized passengers 46 have moved away from the vehicle 12, outside of any of the sensor fields 38, 42, 226 of the sensor assembly 34.

Figure 8:
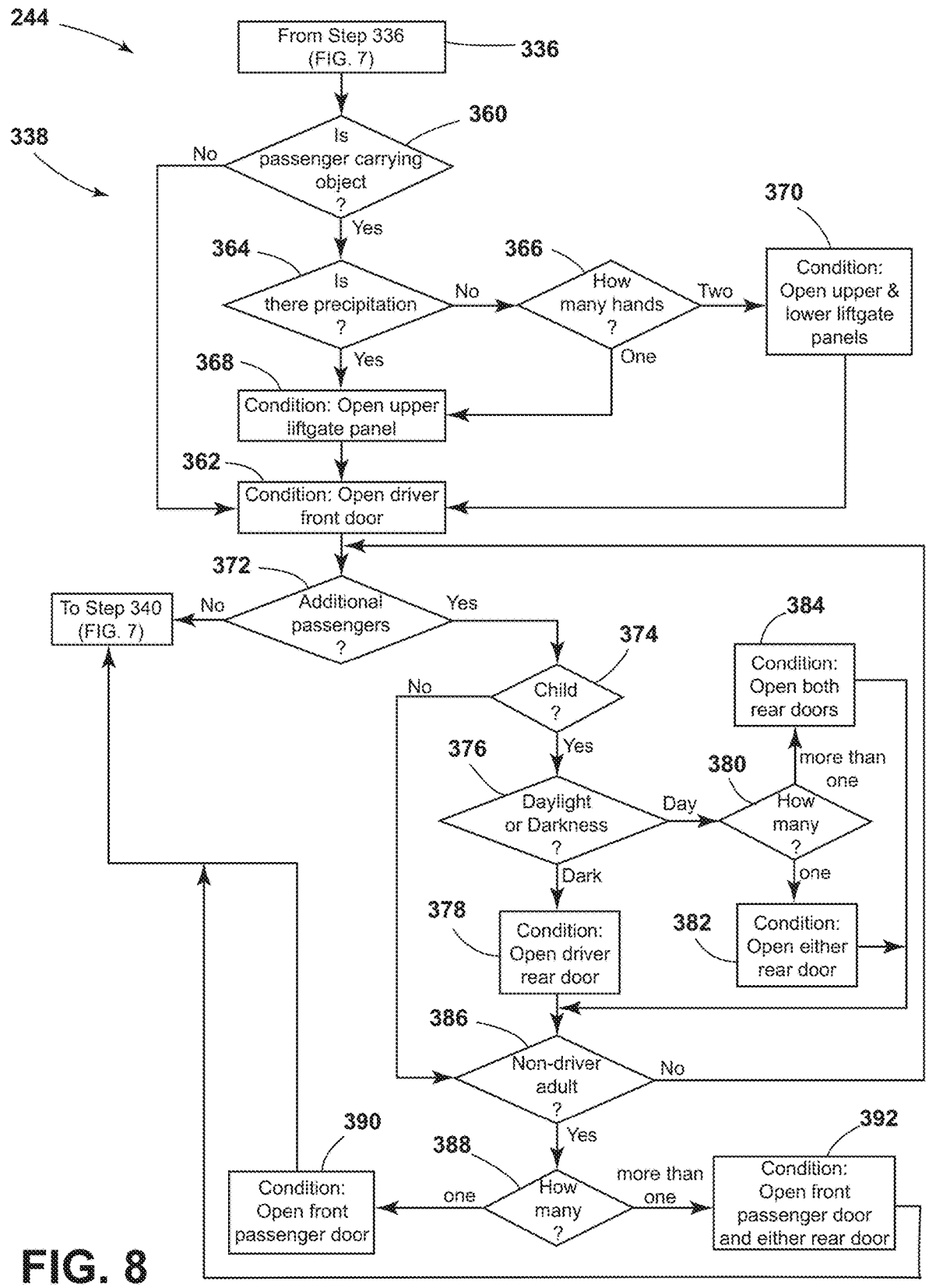
FIG. 8 is a flow diagram of a method for determining conditions that impact vehicle doors to be opened by a door control system, according to a present disclosure.

Referring to FIG. 8, as well as FIGS. 1-7, the step 338 of the routine 244 related to controlling the doors 62 of the vehicle 12 based on determined conditions includes multiple substeps for determining the conditions that affect which doors 62 are opened. The conditions generally relate to who the recognized passengers 46 are, where the recognized passengers 46 are in relation to the vehicle 12, whether one of the recognized passengers 46 is carrying an object 358, weather conditions, sunlight conditions, etc.

From step 336, the controller 44 proceeds to decision substep 360 of determining whether at least one of the recognized passengers 46 is carrying the object 358. In decision substep 360, the controller 44 may also determine whether the object 358 is a personal bag, which is more likely to be stored in a passenger cabin or is larger and more likely to be stored in a cargo space of the vehicle 12. Objects 358 considered to be a personal bag may be stored within the memory 242 of the controller 44.

The recognized passenger 46 may calibrate the door control system 10 to store information about the personal bag or bags. In such examples, the recognized passenger 46 may stand within one of the sensor fields 38, 42, 226 with the personal bag, allowing the door control system 10 to capture data of the personal bag. The recognized passenger 46 may use a voice command that the object 358 is a personal bag not to be stored in the cargo space, which may be detected by the microphone 266 and communicated to the controller 44. The controller 44 may also use machine learning to update the processes relating to recognizing the object 358. If the controller 44 determines that none of the recognized passengers 46 are carrying the object 358, the controller proceeds to substep 362 where the condition is that the front driver door 64 is to be opened. Further, if the recognized passenger 46 is carrying the personal bag and no other object 358, the controller 44 may also proceed to substep 362.

Returning to decision substep 360, if the controller 44 determines that at least one of the recognized passengers 46 is carrying the object 358, which is not the stored personal bag, the controller 44 proceeds to decision substep 364 to determine whether there is precipitation based on information received from the rain sensor 262. If there is no precipitation, the controller proceeds to decision substep 366 where the controller 44 processes the data to determine how many arms or hands the recognized passenger 46 is using to carry the object 358. In decision substep 366, the controller 44 may also determine a size of the object 358. In such examples, the controller 44 may compare the detected object 358 with size information stored within the memory 242.

If, in decision substep 366, the controller 44 determines that the recognized passenger 46 is using one arm or hand to carry the object 358, the controller 44 proceeds to substep 370 to determine that the condition is that the upper liftgate panel 72 is to be opened. In substep 370, the determined condition may also include that the lower liftgate panel 74 is to remain closed. This configuration of opening the liftgate assembly 14 may be advantageous for allowing the recognized passenger 46 to reach over the closed lower liftgate panel 74 to deposit the object 358 within the cargo space of the vehicle 12.

Returning to decision substeps 366, if the controller 44 determines that the recognized passenger 46 is carrying the object 358 with both arms or hands, the controller 44 proceeds to substep 370 where the controller determines that the condition is for both the upper and lower liftgate panels 72, 74 to be opened. Opening both liftgate panels 72, 74 may be advantageous for placing larger or bulkier objects 358 in the cargo space.

Returning to decision substep 364, if the controller 44 determines that there is precipitation, the controller proceeds to substep 368 where the condition is that the upper liftgate panel 72 is to be opened. The condition in substep 368 may be that the lower liftgate panel 74 may remain closed regardless of the size of the object 358. The opened upper liftgate panel 72 may provide cover for the recognized passenger 46 as the recognized passenger 46 places the object 358 in the cargo space. After either one or both of the upper liftgate panel 72 and the lower liftgate panel 74 of the liftgate assembly 14 is opened, the controller 44 proceeds to substep 362 to determine the condition that the front driver door 64 is to be opened.

The controller 44 proceeds to decision sub step 372 to determine if any of the conditions for controlling the doors 62 involve additional passengers other than the person driving the vehicle 12. If the controller 44 determines there are no additional recognized passengers 46 proximate to the vehicle 12, the controller 44 proceeds to decision step 340 (FIG. 6). Returning to decision sub step 372, if the controller determines there are additional recognized passengers 46 proximate to the vehicle 12, the controller 44 proceeds to decision substep 374 of determining whether one or more of the additional recognized passengers 46 is a child. The controller 44 may be able to determine that the recognized passenger 46 is a child based on information stored within the associated profile 280 categorizing the recognized passenger 46 as a child, may detect a height of the recognized passenger 46, or a combination thereof. It is contemplated that any child that was detected in a last key cycle (e.g., a last activation of the door control system 10) may be included as part of the recognized passengers 46.

If the controller 44 determines that there is a child, the controller 44 proceeds to decision substep 376 to determine whether it is daytime or nighttime. The controller 44 receives the information from the sunload sensor 260 relating to the sensed light level around the vehicle 12. The controller 44 may compare the sensed light level to the predefined light level. As previously explained, if the sensed light level is below the predefined light level, the controller 44 may determine that it is nighttime, and if the sensed light is above the predefined light level, the controller 44 may determine that it is daytime. If the controller determines it is nighttime, and therefore darkness has fallen, the controller 44 proceeds to substep 378 of determining that the condition is that the rear driver door 66 is to be opened. This may be advantageous for keeping the child 316 closer to the owner 310 at night for security purposes.

Returning to decision substep 376, if the controller 44 determines that it is light out or daytime, the controller 44 proceeds to decision substep 380 of determining how many children 316, 318 are detected. If the controller 44 determines that only one child 316 is detected, the controller 44 proceeds to substep 382, where the condition is that either the rear driver door 66 or the rear passenger door 70 is to be opened based on the position of the child 316 relative to the vehicle 12. Returning to decision substep 380, if more than one child 316, 318 is detected, the controller 44 proceeds to substep 384 to determine the condition is that both of the rear driver door 66 and the rear passenger door 70 are to be opened.

Returning to decision substep 374, if the controller 44 does not detect a child, the controller 44 proceeds to decision sub step 386 where the controller 44 determines whether there are any non-owner adult passengers 312, 314 proximate to the vehicle 12. Alternatively, the controller 44 may proceed to decision substep 386 after determining the conditions relating to the detected children 316, 318 (e.g., substeps 382, 384). If the controller 44 determines that there are non-owner adult passengers 312, 314, the controller 44 proceeds to decision substep 388 of determining the number of adult passengers 312, 314. In decision substep 388, if the controller 44 determines that there is only one additional adult passenger 312, the controller 44 proceeds to substep 390 where the condition is that the front passenger door 68 is to be opened. Returning to decision substep 388, if the controller 44 determines that there are multiple adult passengers 312, 314, then the controller 44 proceeds to substep 392 where the condition is that the front passenger door 68 and either of the rear driver door 66 and the rear passenger door 70 are opened. It is contemplated that the condition for opening one or both of the rear driver door 66 and the rear passenger door 70 for the adult passengers 312, 314 may be duplicative if the doors 62 are already to be opened based on the conditions relating to the detected children 316, 318.

After determining the conditions for the doors 62 in substep 390 or substep 392, the controller 44 proceeds to decision step 340 (FIG. 6), determining whether the stranger 320 is nearby. Returning to decision substep 386, if the controller 44 determines that there are no additional non-owner adult passengers 312, 314, the controller 44 returns to decision sub step 372 to determine if there are additional recognized passengers 46 proximate to the vehicle 12. It will be understood that the steps of the routine 244 may be performed in any order, simultaneously and/or omitted without departing from the teachings provided herein.

Referring to FIGS. 1-8, the door control system 10 utilizes information detected by the sensor assembly 34 to control the opening and closing of the various doors 62 of the vehicle 12. The doors 62 that are opened depend on a variety of conditions as described herein. The conditions determined by the controller 44 in FIG. 7 are based on the weather, darkness, type of recognized passenger 46 approaching the vehicle 12, etc. For example, when it is dark outside, the owner 310 of the vehicle 12 may want to keep the child passenger 316 closer for security purposes, therefore the controller 44 operates to open the rear driver door 66 for the child 316 rather than the rear passenger door 70. Additionally, when the stranger 320 is positioned proximate to the vehicle 12, the controller 44 adjusts how the doors 62 are to be opened based on the determined conditions and to open the door 62 away from the stranger 320 for security purposes.

Additionally, the timing of the activation of the actuation assembly 90 to open one or more of the doors 62 is based on the speed of the recognized passenger 46. The controller 44 determines the speed of the recognized passenger 46 approaching vehicle 12 and activates the actuation assembly 90 to open the respective door 62 about when the recognized passenger 46 arrives at the door 62. This provides additional security and safety from weather conditions to be able to enter the vehicle 12 as soon as the recognized passenger 46 arrives at the vehicle 12. Accordingly, each door 62 may open at a different time based on and aligns with the arrival of the recognized passenger 46 at the respective door 62.

Moreover, which door 62 is opened depends on the position of the recognized passenger 46 relative to the vehicle. If the recognized passenger 46 is approaching the vehicle 12 proximate to the driver side 130, one of the doors 62 on the driver side 130 is opened. Additionally, the liftgate assembly 14 is automatically opened by the door control system 10 when the object 358 is being carried by at least one of the recognized passengers 46. In another example, the child passenger 316 may be carrying the object 358 and be positioned proximate to the liftgate assembly 14. If the child 316 is carrying the object 358 and the liftgate assembly 14 would open if the owner 310 or the adult passengers 312, 314 was carrying the object 358, the liftgate assembly 14 may be opened when the owner 310 is within a predefined distance of the vehicle 12. The door control system 10 operates to open the liftgate assembly 14 as well as any of the side doors 28 concurrently. In this way, the owner 310 may place the object 358 in the cargo space of the vehicle 12 while concurrently allowing the children 316, 318 and/or other adult passengers 312, 314 to enter the vehicle 12. Further, the door 62 may be opened in a hands-free manner, which may be advantageous for when the recognized passenger 46 is carrying the object 358 and may not be able to access the authentication device 292.

Figure 9:
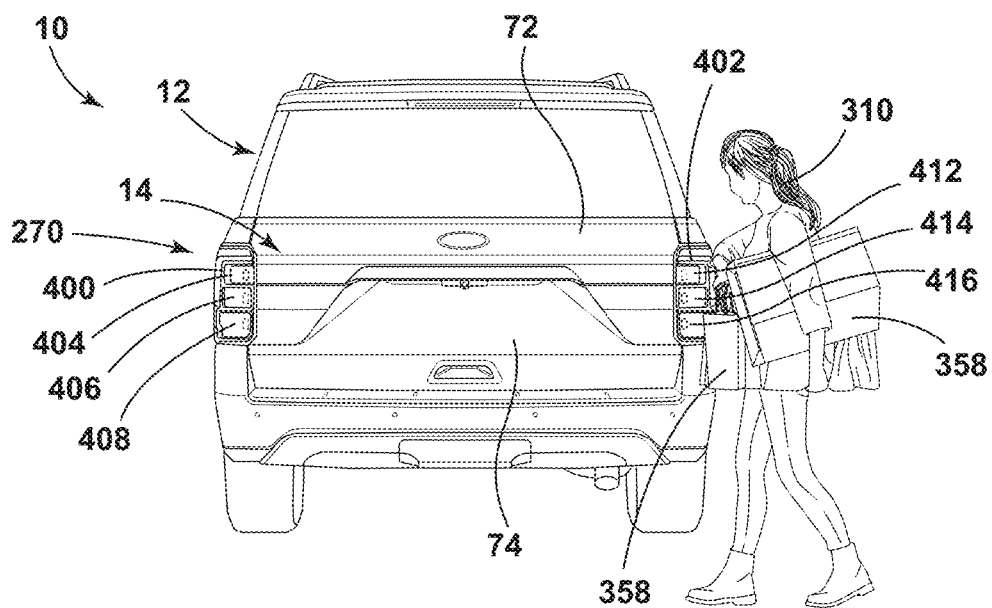
FIG. 9 is a rear perspective view of a vehicle having a door control system, according to the present disclosure.
Figure 10:
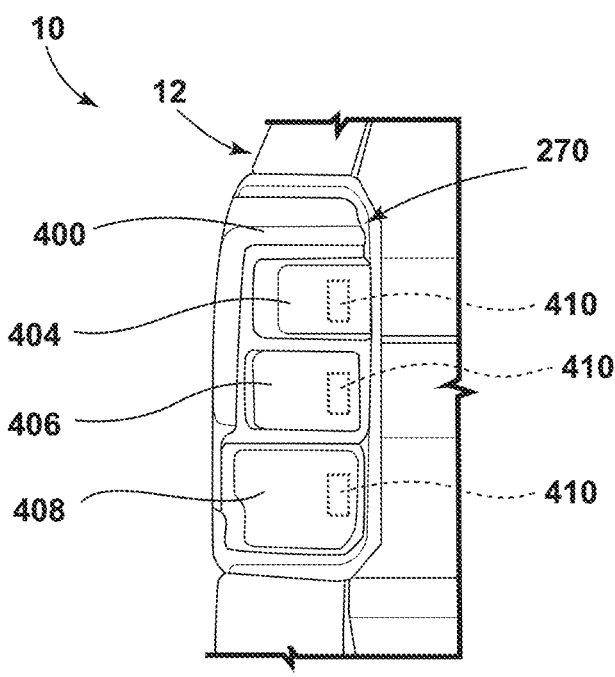
FIG. 10 is a partial perspective view of a taillight of a vehicle having a door control system, according to the present disclosure.

Referring again to FIG. 3, as well as FIGS. 9 and 10, the vehicle 12 includes the lamp assembly 270, which includes two taillights 400, 402 in the illustrated example. As illustrated, the first taillight 400 includes three light sources 404, 406, 408. Further, each light source 404, 406, 408 is associated with a capacitive sensor 410, such that the taillight 400 has three capacitive sensors 410. Similarly, the second taillight 402 includes three light sources 412, 414, 416, with each light source 412, 414, 416 associated with a capacitive sensor 418. Each first light source 404, 412 may be a backup light, each second light source 406, 414 may be a turn indicator light, and each third light source 408, 416 may be a brake light.

The taillights 400, 402 may be activated by the controller 44 to illuminate in a predefined light pattern based on the control of the upper and lower liftgate panels 72, 74. For example, the first light sources 404, 412 may be illuminated when the upper liftgate panel 72 is activated. The first light sources 404, 412 may blink or flash while the upper liftgate panel 72 is opening or closing and may remain illuminated when the upper liftgate panel 72 is in the opened position 20. The second light sources 406, 414 may illuminate when both the upper and lower liftgate panel 72, 74 are activated. Similarly, the third light sources 408, 416 may illuminate when the lower liftgate panel 74 is activated. It is contemplated that one or both of the taillights 400, 402 is activated in response to movement of the liftgate assembly 14.

Alternatively, the light sources 404, 406, 408 of the taillight 400 and the light sources 412, 414, 416 of the taillight 402 may be independently utilized to signal which aspect of the liftgate assembly 14 is activated. For example, when the upper liftgate panel 72 is opening, the taillights 400, 402 may flash a continuous pattern between the third light sources 408, 416, then the second light sources 406, 414, and then the first light sources 404, 412. When the upper liftgate panel 72 is closing, the light pattern may be reversed. When the lower liftgate panel 74 is opening, a different light pattern may be utilized. For example, the first light sources 404, 412 may flash first, followed by the second light sources 406, 412, and then the third light sources 408, 416 when the lower liftgate panel 74 is opening, and a reverse pattern may be utilized when the lower liftgate panel 74 is closing. When both upper and lower liftgate panels 72, 74 are opening or closing, all three light sources 404, 406, 408 of the first taillight 400 and all three light sources 412, 414, 416 of the second taillight 402 may illuminate or flash. The patterns discussed herein are merely exemplary and are not meant to be limiting.

Figure 11:
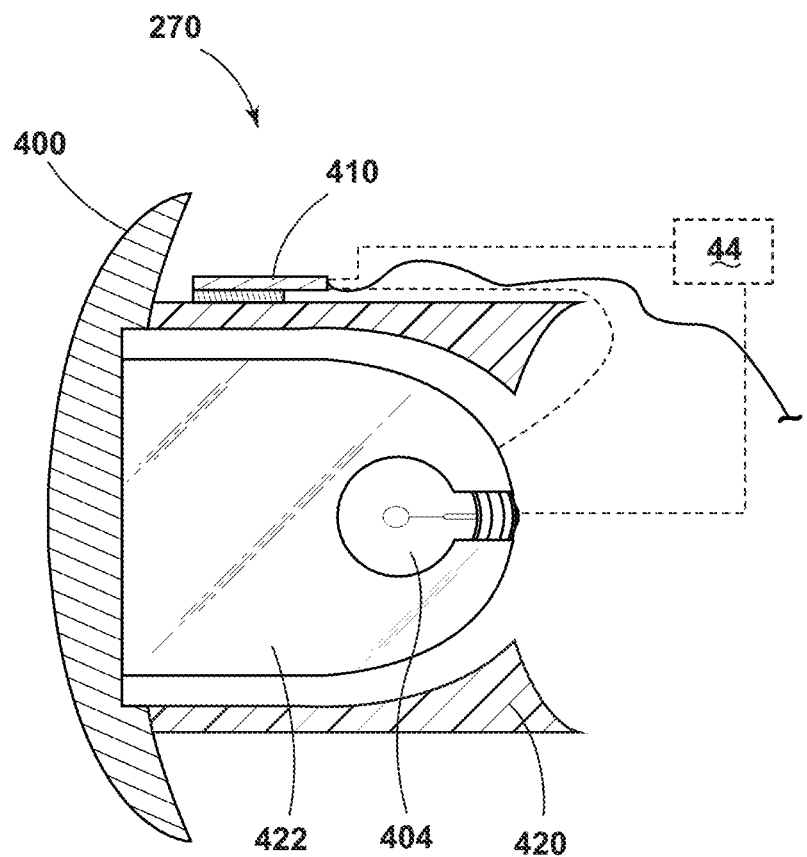
FIG. 11 is a cross-sectional view of a taillight of a vehicle having a capacitive sensor, according to the present disclosure.

Referring still to FIGS. 3, 9, 10, as well as FIG. 11, each light source 404, 406, 408 of the first taillight 400 may be associated with the respective capacitive sensor 410 and/or each light source 412, 414, 416 may be associated with the respective capacitive sensor 418. Accordingly, each taillight 400, 402 includes three capacitive sensors 410, 418, respectively. The capacitive sensors 410, 418 may be double coupled to the taillights 400, 402, allowing the capacitive sensors 410, 418 to be coupled to a housing 420. The housing 420 is generally constructed of plastic materials. Inside each housing 420 is a reflective layer 422, which is constructed of metal materials, for example, chrome. Each capacitive sensor 410, 418 is coupled to the associated reflective layer 422. The reflective layers 422 then operate as a second capacitor.

A change in capacitance on the capacitive sensors 410, 418, for example, from a touch event, induces a change in capacitance in the second capacitor (e.g., the respective reflective layer 422). The sensed change in capacitance is communicated to the controller 44 and may be utilized to control one of the doors 62. For example, the owner 310 may want to manually control the liftgate assembly 14. In such examples, the taillights 400, 402 may be utilized to determine which component of the liftgate assembly 14 is to be opened or closed by utilizing a touch event sensed by the capacitive sensors 410, 418. The recognized passenger 46 who may be carrying object 358 may tap the specific light source 404, 406, 408 or the light source 412, 414, 416 to designate whether the upper liftgate panel 72, the lower liftgate panel 74, or both liftgate panels 72, 74, are to be opened or closed. The capacitive sensor 410, 418 associated with the first light sources 404, 412 may control the upper liftgate panel 72, while the capacitive sensors 410, 418 associated with the third light sources 408, 416 may control the lower liftgate panel 74. The capacitive sensors 410, 418 associated with the second light sources 406, 414 may concurrently control both the upper and lower liftgate panels 72, 74. It is contemplated that a single taillight 400, 402 may include the capacitive sensors 410, 418, respectively, or alternatively both taillights 400, 402 may include the capacitive sensors 410, 418.

Referring still to FIGS. 3 and 9-11, in an additional or alternative configuration, the capacitive sensors 410, 418 of the taillights 400, 402 may be utilized to control the various side doors 28 of the vehicle 12, as well as the liftgate assembly 14. Utilizing the first taillight 400, the capacitive sensor 410 associated with the first light source 404 may control the front driver door 64, and the capacitive sensor 410 associated with the second light source 406 may control the rear driver door 66. Utilizing the second taillight 402, the capacitive sensor 418 associated with the first light source 412 may control the front passenger door 68, and the capacitive sensor 418 associated with the second light 414 may be utilized to control the rear passenger door 70. The third light sources 408, 416 of the taillights 400, 402 may control the liftgate assembly 14. In a split liftgate examples, the third light source 408 of the taillight 400 may control the upper liftgate panel 72, while the third light source 416 of the second taillight 402 may control the lower liftgate panel 74. In addition to utilizing the capacitive sensors 410, 418 to adjust selected doors 62, the taillights 400, 402 may also illuminate in selected patterns, as described herein. Additionally or alternatively, the light sources 404, 406, 408 and the light sources 412, 414, 416 may illuminate when the corresponding door 62 is activated (e.g., the light source 404 is illuminated when the front driver door 64 is activated).

Referring to FIGS. 1-11, the owner 310 may change what the capacitive sensors 410, 418 control, for example, through the mobile device 296. The owner 310 may also control whether the manual activation through the touch event will be utilized or whether the door 62 will open automatically based on detected information from the sensor assembly 34. It is contemplated that the side doors 28 may be configured to open automatically while the liftgate assembly 14 is configured to be opened manually through the touch event and vice versa.

Use of the present device and system may provide for a variety of advantages. For example, the door control system 10 may automatically open one or more doors 62 as the recognized passengers 46 approach the vehicle 12. Additionally, the door control system 10 may determine the status of each recognized passenger 46 (e.g., a child or an adult, etc.) and open the respective side doors 28 based on this information. Also, the door control system 10 may determine whether the liftgate assembly 14 is to be opened if one of the recognized passengers 46 is carrying object 358. Further, based on the size of the object 358, the controller 44 determined whether one or both of the liftgate panels 72, 74 is to be opened and activates the actuation assembly 90 accordingly. Moreover, the door control system 10 monitors the speed of the approach of the recognized passengers 46 and times activation of the actuation assembly 90 based on the determined speed. In this way, the respective door 62 is opened by the door control system 10 as the recognized passenger 46 reaches the door 62. Further, if an object or recognized passenger 46 is detected within the movement path of the respective door 62, the door 62 may remain in a closed state. Further, if the movement path is obstructed or the stranger 320 is detected proximate to the vehicle 12, the door control system 10 may emit an audible warning to ask the respective person to move. Further, the doors 62 that are opened by the door control system 10 are determined based on a variety of conditions, including speed of recognized passengers 46, the status of the recognized passengers 46, weather conditions, whether the object 358 is being carried, whether the stranger 320 is positioned proximate to the vehicle 12, etc. Moreover, the controller 44 includes routines 244 to conduct these processes and may continually update the routines 244 with machine learning. Further, the controller 44 may store profiles 280 of the recognized passengers 46. Additional benefits or advantages may be realized and/or achieved.

According to various examples, a door control system for a vehicle includes a liftgate assembly including a liftgate actuation assembly operably coupled to at least one liftgate panel. The liftgate actuation assembly adjusts the at least one liftgate panel between an opened position and a closed position. A side door assembly includes a door actuation assembly operably coupled to at least one side door. The door actuation assembly adjusts the at least one side door between an opened position and a closed position. A sensor assembly includes a first sensor defining a rear sensor field extending outwardly from the liftgate assembly and a second sensor defining a side sensor field extending outwardly from the side door assembly. A controller is communicatively coupled with the liftgate assembly, the side door assembly, and the sensor assembly. The controller determines whether a person detected in at least one of the rear sensor field and the side sensor field is a recognized passenger, determines a speed of the recognized passenger, and activates at least one of the liftgate actuation assembly and the door actuation assembly to adjust the at least one liftgate panel and the at least one side door, respectively, to the opened position based on a position of the recognized passenger relative to said vehicle and the speed of recognized passenger. Embodiments of the present disclosure may include one or a combination of the following features:

- the controller activates the door actuation assembly to open the at least one side door when the recognized passenger is a child;
- the at least one side door includes a passenger side door and a driver side door, wherein the second sensor includes a passenger side sensor disposed proximate to the passenger side door and a driver side sensor disposed proximate to the driver side door;
- a sound exciter communicatively coupled to the controller, wherein the controller determines a person within at least one of the side sensor field of the passenger side sensor and the side sensor field of the driver side sensor, and wherein the sound exciter emits an audible warning when a non-recognized person is detected;
- the controller activates the door actuation assembly to open the driver side door when the non-recognized person is detected in the side sensor field of the passenger side sensor;
- the controller determines whether the recognized passenger is carrying an object, wherein the controller determines how many hands the recognized passenger is utilizing to carry the object;
- the at least one liftgate panel includes an upper liftgate panel and a lower liftgate panel, wherein the controller activates the liftgate actuation assembly to open the upper liftgate panel when the recognized passenger is carrying the object with one hand; and
- the at least one liftgate panel includes an upper liftgate panel and a lower liftgate panel, wherein the controller activates the liftgate actuation assembly to open the upper liftgate panel and the lower liftgate panel when the recognized passenger is carrying the object with two hands.

According to various examples, a vehicle door control system includes a vehicle body. A door assembly is coupled to the vehicle body and includes at least one side door and a liftgate. The door assembly includes an actuation assembly that adjusts each of the at least one side door and the liftgate between an opened position and a closed position. A sensor assembly is coupled to the vehicle body and defines a rear sensor field, a first side sensor field, and a second side sensor field. A controller is communicatively coupled with the door assembly and the sensor assembly. The controller determines whether a person in at least one of the rear sensor field, the first side sensor field, and the second side sensor field is a recognized passenger, determines a speed of the recognized passenger, determines whether the recognized passenger is carrying an object, and activates the actuation assembly to open at least one of the liftgate and the at least one side door based on whether the recognized passenger is carrying an object, where timing of activation of the actuation assembly is based on the speed of the recognized passenger. Embodiments of the present disclosure may include one or a combination of the following features:

a rain sensor coupled to the vehicle body and in communication with the controller, wherein the liftgate includes an upper liftgate panel and a lower liftgate panel, and wherein the controller activates the actuation assembly to adjust the upper liftgate panel to the opened position when the recognized passenger is carrying the object and when the rain sensor senses precipitation;

the sensor assembly includes an imager that captures image data within at least the rear sensor field, wherein the controller communicates the image data to a remote storage;

a lamp assembly coupled to the vehicle body proximate to the liftgate, wherein the liftgate includes an upper liftgate panel and a lower liftgate panel, and wherein the lamp assembly includes multiple lights that illuminate in a predefined pattern based on movement of at least one of the upper liftgate panel and the lower liftgate panel between the opened position and the closed position, respectively;

activation of the actuation assembly to open at least one of the liftgate and the at least one side door aligns with an arrival of the recognized passenger at the respective one of the liftgate and the at least one side; and a sunload sensor in communication with the controller, wherein the at least one side door includes a passenger side door and a driver side door, wherein the controller activates the actuation assembly to open the driver side door when a sensed light level is below a predefined light level and a person in at least one of the rear sensor field, the first side sensor field, and the second side sensor field is a recognized child passenger.

According to various examples, a door control system for a vehicle includes a door assembly including an actuation assembly. The door assembly includes a front driver door, a rear driver door, a front passenger door, a rear passenger door, and a liftgate. A sensor assembly includes a rear sensor defining a rear sensor field extending from the liftgate, a passenger side sensor defining a passenger side sensor field extending from a passenger side of said vehicle, and a driver side sensor defining a driver side sensor field extending from a driver side of said vehicle. A controller is in communication with the actuation assembly and the sensor assembly.

The controller determines whether people within at least one of the rear sensor field, the passenger side sensor field, and the driver side sensor field are recognized passengers, determines whether at least one of the recognized passengers is carrying an object; activates the actuation assembly to open the liftgate when the object is detected, determines whether at least one of the recognized passengers is a child; and activates the actuation assembly to open at least one of the rear passenger door and the rear driver door when one of the recognized passengers is the child. Embodiments of the present disclosure may include one or a combination of the following features:

a lamp assembly coupled to said vehicle proximate to the liftgate, wherein the lamp assembly includes a capacitive sensor, and wherein the controller activates the actuation assembly to open at least one of the front driver door, the front passenger door, the rear passenger door, and the rear driver door based on a sensed change in capacitance;

a sunload sensor communicatively coupled to the controller, wherein the controller determines whether to open the rear passenger door or the rear driver door when at least one of the recognized passengers is the child based on a sensed light level;

the controller determines a speed of each of the recognized passengers, wherein activation of the actuation assembly is based on a position of each of the recognized passengers relative to said vehicle and the speed of each of the recognized passengers;

the controller activates the sensor assembly when an authentication device is detected; and the liftgate includes an upper liftgate panel and a lower liftgate panel.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A door control system for a vehicle, comprising:
    a liftgate assembly including a liftgate actuation assembly operably coupled to an upper liftgate panel and a lower liftgate panel, wherein the liftgate actuation assembly selectively adjusts the upper liftgate panel and the lower liftgate panel between an opened positions and closed positions, respectively;
    a side door assembly including a door actuation assembly operably coupled to at least one side door, wherein the door actuation assembly adjusts the at least one side door between an opened position and a closed position;
    a sensor assembly including a first sensor defining a rear sensor field extending outwardly from the liftgate assembly and a second sensor defining a side sensor field extending outwardly from the side door assembly; and
    a controller communicatively coupled with the liftgate assembly, the side door assembly, and the sensor assembly, wherein the controller:
        determines whether a person detected in at least one of the rear sensor field and the side sensor field is a recognized passenger;
        determines a speed of the recognized passenger;
        activates at least one of the liftgate actuation assembly and the door actuation assembly to adjust at least one of the upper liftgate panel and the lower liftgate panel and the at least one side door, respectively, to the opened position based on a position of the recognized passenger relative to said vehicle and the speed of the recognized passenger; and
        determines whether the recognized passenger is carrying an object and how many hands the recognized passenger is utilizing to carry the object,
        wherein the controller activates the liftgate actuation assembly to open the upper liftgate panel when the recognized passenger is carrying the object with one hand, and
        wherein the controller activates the liftgate actuation assembly to open the upper liftgate panel and the lower liftgate panel when the recognized passenger is carrying the object with two hands.

2. The door control system of claim 1, wherein the controller activates the door actuation assembly to open the at least one side door when the recognized passenger is a child.

3. The door control system of claim 1, wherein the at least one side door includes a passenger side door and a driver side door, and wherein the second sensor includes a passenger side sensor disposed proximate to the passenger side door and a driver side sensor disposed proximate to the driver side door.

4. The door control system of claim 3, further comprising:
    a sound exciter communicatively coupled to the controller, wherein the controller determines a non-recognized person is within at least one of the side sensor field of the passenger side sensor and the side sensor field of the driver side sensor, and wherein the sound exciter emits an audible warning when the non-recognized person is detected.

5. The door control system of claim 4, wherein the controller activates the door actuation assembly to open the driver side door when the non-recognized person is detected in the side sensor field of the passenger side sensor.

6. The door control system of claim 4, wherein the controller modifies which of the driver side door and the passenger side door is opened based on a detected position of the non-recognized person.

7. The door control system of claim 1, wherein the sensor assembly includes a third sensor defining a front sensor field extending forward from a vehicle body of said vehicle.

8. The door control system of claim 1, wherein activation of the liftgate actuation assembly and the door actuation assembly aligns with an arrival of the recognized passenger at a respective one of the liftgate assembly and the at least one side door.

9. The door control system of claim 1, wherein the controller activates the sensor assembly when an authentication device is detected.

10. The door control system of claim 1, wherein the sensor assembly includes an imager that captures image data within at least the rear sensor field, and wherein the controller communicates the image data to a remote storage.

11. The door control system of claim 10, wherein the controller processes the image data to determine whether the person detected by the sensor assembly is the recognized passenger.

12. The door control system of claim 1, further comprising:
    a sound exciter communicatively coupled to the controller, wherein the sound exciter includes a microphone to receive a voice command.

13. The door control system of claim 12, wherein the microphone communicates the voice command to the controller, and wherein the controller updates processes for recognizing the object based on the voice command.

14. The door control system of claim 13, wherein the at least one side door includes a front driver door, and wherein the controller activates the door actuation assembly to open the front driver door when the object is a personal bag.

15. The door control system of claim 1, further comprising:
    a rain sensor in communication with the controller, wherein the controller activates the liftgate actuation assembly to adjust the upper liftgate panel to the opened position when the recognized passenger is carrying the object and when the rain sensor senses precipitation.

16. The door control system of claim 15, wherein the lower liftgate panel remains in the closed position when the rain sensor senses precipitation.

17. The door control system of claim 1, wherein the at least one side door includes a passenger front door, and wherein the controller activates the door actuation assembly to open the passenger front door when the recognized passenger is a non-owner adult passenger.

18. The door control system of claim 1, wherein the controller:
determines additional people are detected by the sensor assembly; and
determines the additional people are additional recognized passengers.

19. The door control system of claim 18, wherein the at least one side door includes a front driver door, a front passenger door, a rear driver door, and a rear passenger door, wherein the controller:
activates the door actuation assembly to open the front passenger door when one of the additional recognized passengers is a non-owner adult passenger; and
activates the door actuation assembly to open the front passenger door and at least one of the rear driver door and the rear passenger door when at least two of the additional recognized passengers are non-owner adult passengers.

20. The door control system of claim 18, wherein the at least one side door includes a front driver door, a front passenger door, a rear driver door, and a rear passenger door, wherein the controller:
activates the door actuation assembly to open at least one of the rear driver door and the rear passenger door when one of the additional recognized passengers is a child; and
activates the door actuation assembly to open the rear driver door and the rear passenger door when at least two of the additional recognized passengers are children.

* * * * *